US012642349B1

(12) United States Patent

Holt

(10) Patent No.: US 12,642,349 B1

(45) Date of Patent: Jun. 2, 2026

(54) CASE FOR STORING AND LUBRICATING DRILL BITS

(71) Applicant: Austin Holt, Meridian, ID (US)

(72) Inventor: Austin Holt, Meridian, ID (US)

( * ) Notice: Subject to any disclaimer, the term of this patent is extended or adjusted under 35 U.S.C. 154(b) by 0 days.

(21) Appl. No.: 19/067,256

(22) Filed: Feb. 28, 2025

(51) Int. Cl.

| | |
|---|---|
| *A46B 15/00* | (2006.01) |
| *A46B 9/02* | (2006.01) |
| *A46B 17/08* | (2006.01) |
| *B23Q 11/10* | (2006.01) |
| *B25H 3/00* | (2006.01) |
| *F16N 15/00* | (2006.01) |
| *F16N 19/00* | (2006.01) |

(52) U.S. Cl.

CPC .......... *A46B 15/0091* (2013.01); *A46B 9/026* (2013.01); *A46B 15/0061* (2013.01); *A46B 17/08* (2013.01); *B25H 3/003* (2013.01); *F16N 15/00* (2013.01); *F16N 19/00* (2013.01); *A46B 2200/3073* (2013.01); *B23Q 11/10* (2013.01)

(58) Field of Classification Search

CPC ............ A46B 2200/3073; A46B 9/026; A46B 15/0091; A46B 15/0061; A46B 17/08; B23Q 11/10; B65D 85/20; B65D 85/24; F16N 15/00; F16N 19/00; Y10T 407/14; Y10T 408/96; Y10T 408/95; Y10T 408/455

USPC ......... 15/104.92, 104.04, 106; 206/207, 379, 206/362.1; 211/70.6; 312/73, 97.1; 408/241 R

See application file for complete search history.

(56) References Cited

U.S. PATENT DOCUMENTS

| | | | | |
|---|---|---|---|---|
| 1,341,848 | A | * | 6/1920 | Haensler ................ B25H 3/003 |
| | | | | D11/95 |
| 1,404,016 | A | * | 1/1922 | Engelbrekt ............ B23Q 11/10 |
| | | | | 408/56 |
| 1,529,090 | A | | 3/1925 | Scholin |
| 2,847,880 | A | * | 8/1958 | Neidig ................... B23Q 11/10 |
| | | | | 62/DIG. 10 |
| 3,019,494 | A | * | 2/1962 | Horie ........................ A61L 2/00 |
| | | | | 206/208 |
| 3,063,551 | A | * | 11/1962 | Russell .................. B65D 83/02 |
| | | | | 312/73 |
| 3,156,364 | A | * | 11/1964 | Wolcott ................. B44D 3/125 |
| | | | | 206/209 |
| 3,615,004 | A | | 10/1971 | Wescott |
| 4,222,486 | A | | 9/1980 | Roth |
| 4,327,060 | A | * | 4/1982 | Nisii ........................ A61L 2/26 |
| | | | | 422/300 |
| D288,985 | S | | 3/1987 | Ali |
| 4,995,511 | A | * | 2/1991 | Evans ................... A45D 44/18 |
| | | | | 206/362.1 |
| 5,308,406 | A | * | 5/1994 | Wallock ................... B08B 3/04 |
| | | | | 15/21.2 |

(Continued)

*Primary Examiner* — Gideon R Weinerth

(57) ABSTRACT

A cutting tool storage case for storing, lubricating, and cleaning cutting tools such as drill bits includes a body which defines an interior space therein which is open at a bottom end of the body. A holder member is coupled to the top end of the body and defines a plurality of apertures which extends through the holder member to the interior space of the body. The cutting tools may be inserted into the apertures to extend into the interior space of the body. A lubricant cup is coupled to the bottom end of the body. The lubricant cup defines a reservoir which is configured for containing a lubricant for use on the cutting tools.

14 Claims, 7 Drawing Sheets

(56)     References Cited

U.S. PATENT DOCUMENTS

| | | | |
|---|---|---|---|
| 5,363,957 A * | 11/1994 | Reichner | A47F 5/0006 |
| | | | 206/349 |
| 5,474,182 A | 12/1995 | Reney | |
| D394,133 S * | 5/1998 | Mead | D32/35 |
| 6,299,368 B1 * | 10/2001 | Tavularis | A23P 20/17 |
| | | | 401/12 |
| D456,990 S | 5/2002 | Lusty | |
| 6,708,363 B2 * | 3/2004 | Larsen | A61L 2/18 |
| | | | 15/210.1 |
| 7,789,229 B2 * | 9/2010 | Frakes | B25H 3/02 |
| | | | 206/373 |
| 8,572,793 B1 * | 11/2013 | Huntley | B08B 1/12 |
| | | | 15/104.94 |
| 8,607,396 B2 * | 12/2013 | Albright | A47L 21/04 |
| | | | 220/500 |
| 9,610,680 B2 | 4/2017 | Diamond | |
| 10,017,321 B2 * | 7/2018 | Empey | B65D 85/20 |
| 2020/0094396 A1 | 3/2020 | Steiner | |

* cited by examiner

CASE FOR STORING AND LUBRICATING DRILL BITS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cutting tool storage case and more particularly pertains to a new cutting tool storage case for storing, lubricating, and cleaning cutting tools such as drill bits.

(2) Description of Related Art Including Information Disclosed Under 37 CFR 1.97 and 1.98

The prior art discloses various indexing storage cases for drill bits and other cutting tools, many of which have a cylindrical body and apertures extending through a top of the body to receive and hold the cutting tools. However, the prior art fails to describe such an apparatus in which a lubricant cup is positioned at a bottom of the body such that the cutting tools may be lubricated via lubricant held in the lubricant cup while the cutting tools are held in the body.

BRIEF SUMMARY OF THE INVENTION

An embodiment of the disclosure meets the needs presented above by generally comprising a body which defines an interior space therein which is open at a bottom end of the body. A holder member is coupled to the top end of the body and defines a plurality of apertures which extends through the holder member to the interior space of the body. Each aperture of the plurality of apertures is sized and configured to receive an associated cutting tool of a plurality of cutting tools therethrough to the interior space of the body. A lubricant cup is coupled to the bottom end of the body. The lubricant cup comprises a bottom wall and a perimeter wall coupled to the bottom wall. The lubricant cup defines a reservoir which is surrounded by the bottom wall and the perimeter wall. The reservoir is configured for containing a lubricant for use on the cutting tools.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
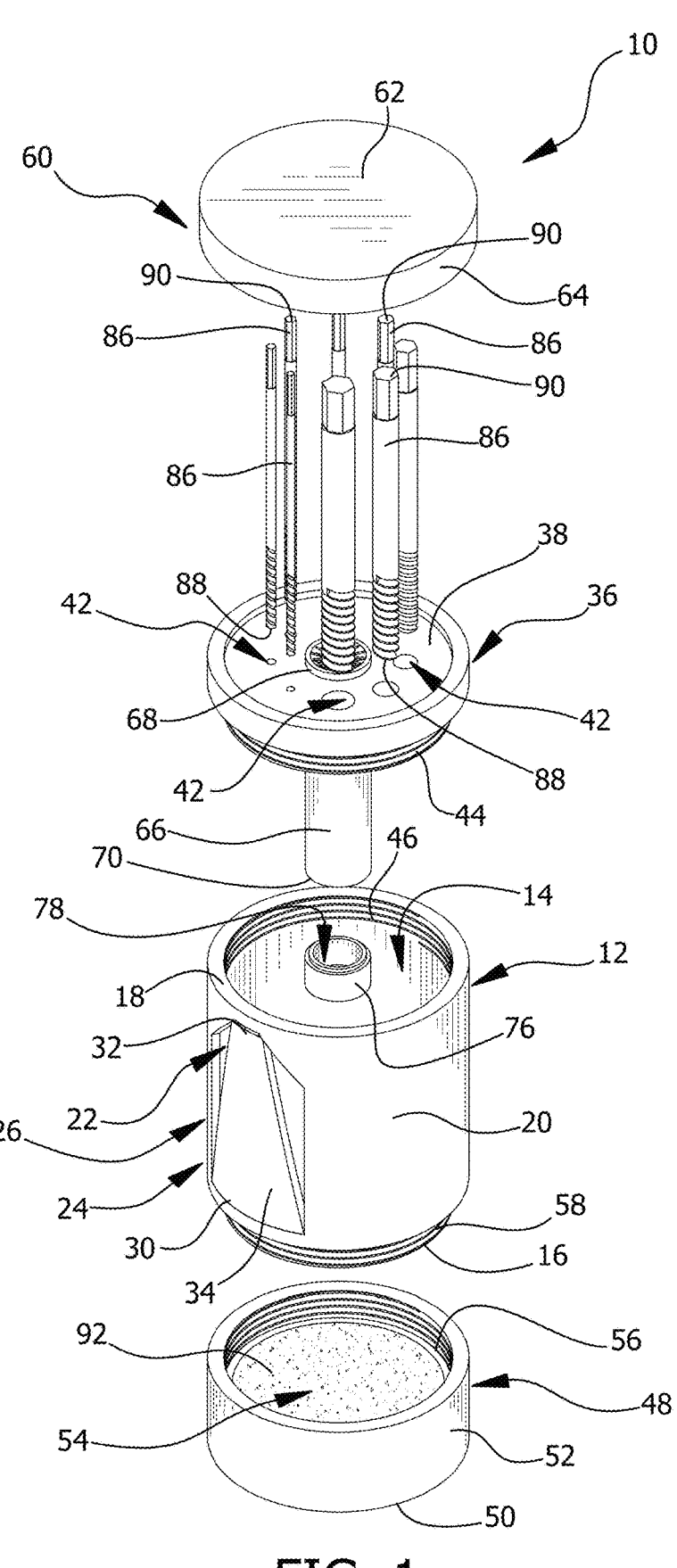
FIG. 1 is a top perspective exploded view of a cutting tool storage case according to an embodiment of the disclosure.
Figure 2:
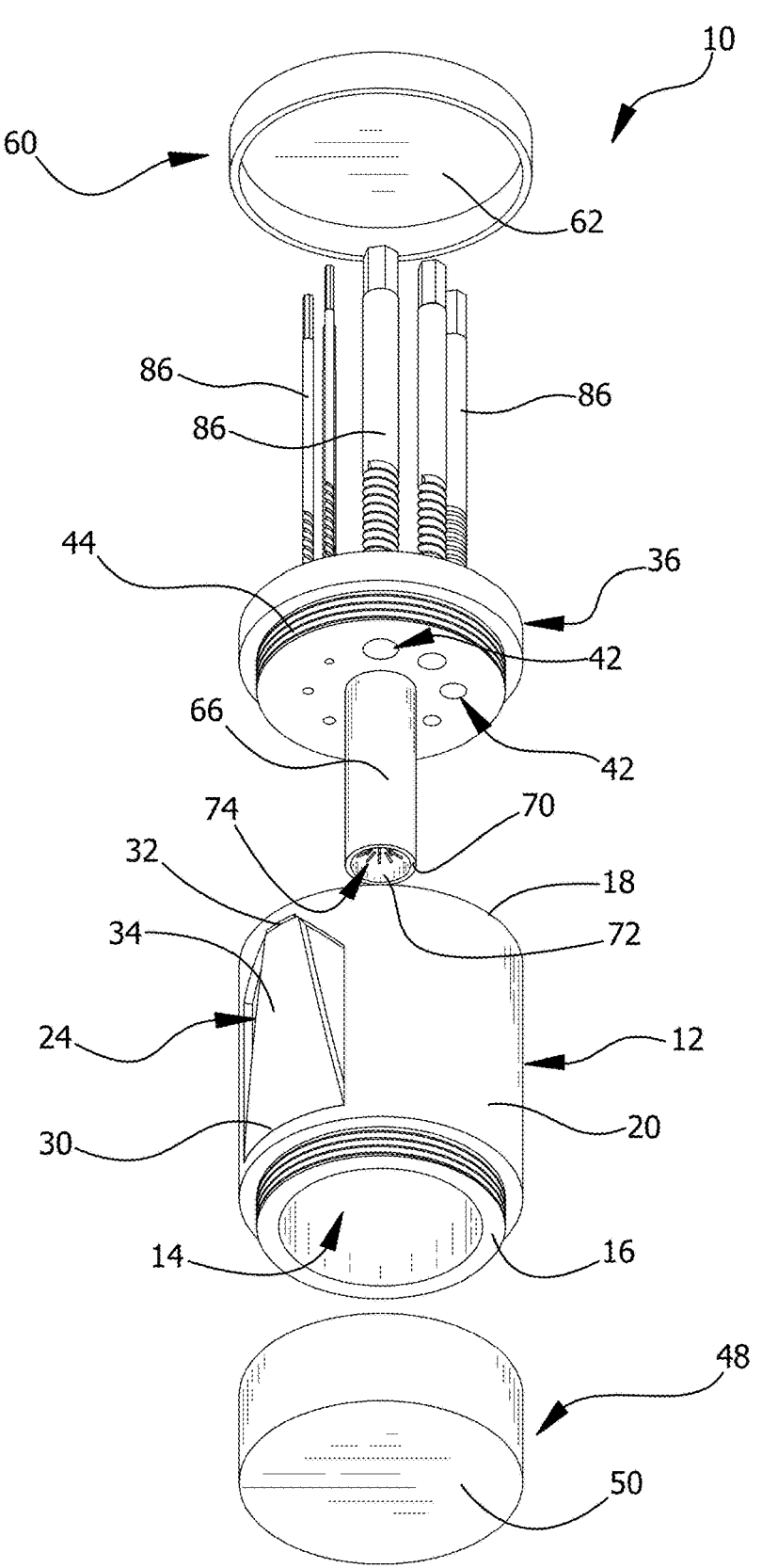
FIG. 2 is a bottom perspective exploded view of an embodiment of the disclosure.
Figure 3:
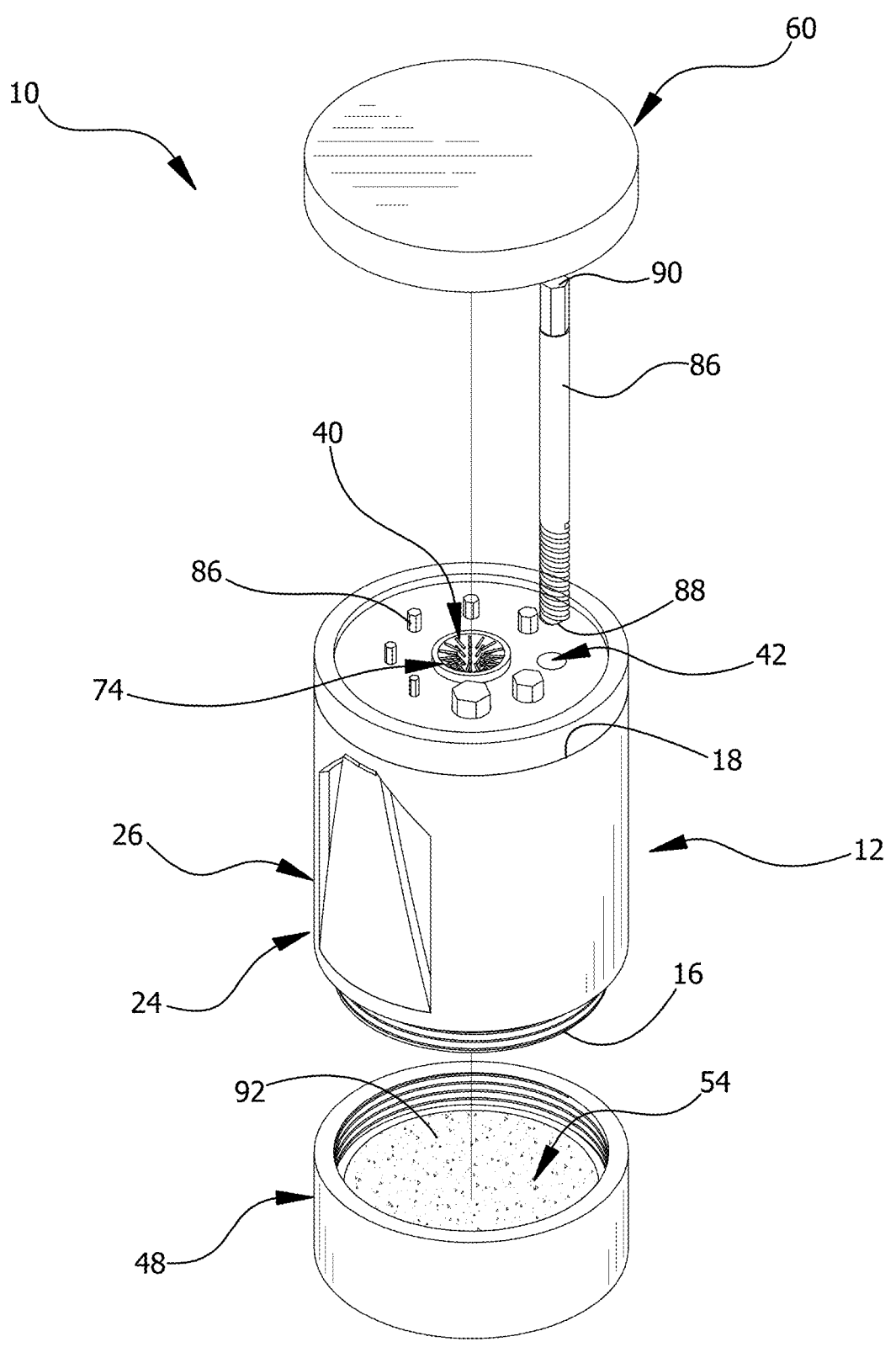
FIG. 3 is a top perspective exploded view of an embodiment of the disclosure.
Figure 4:
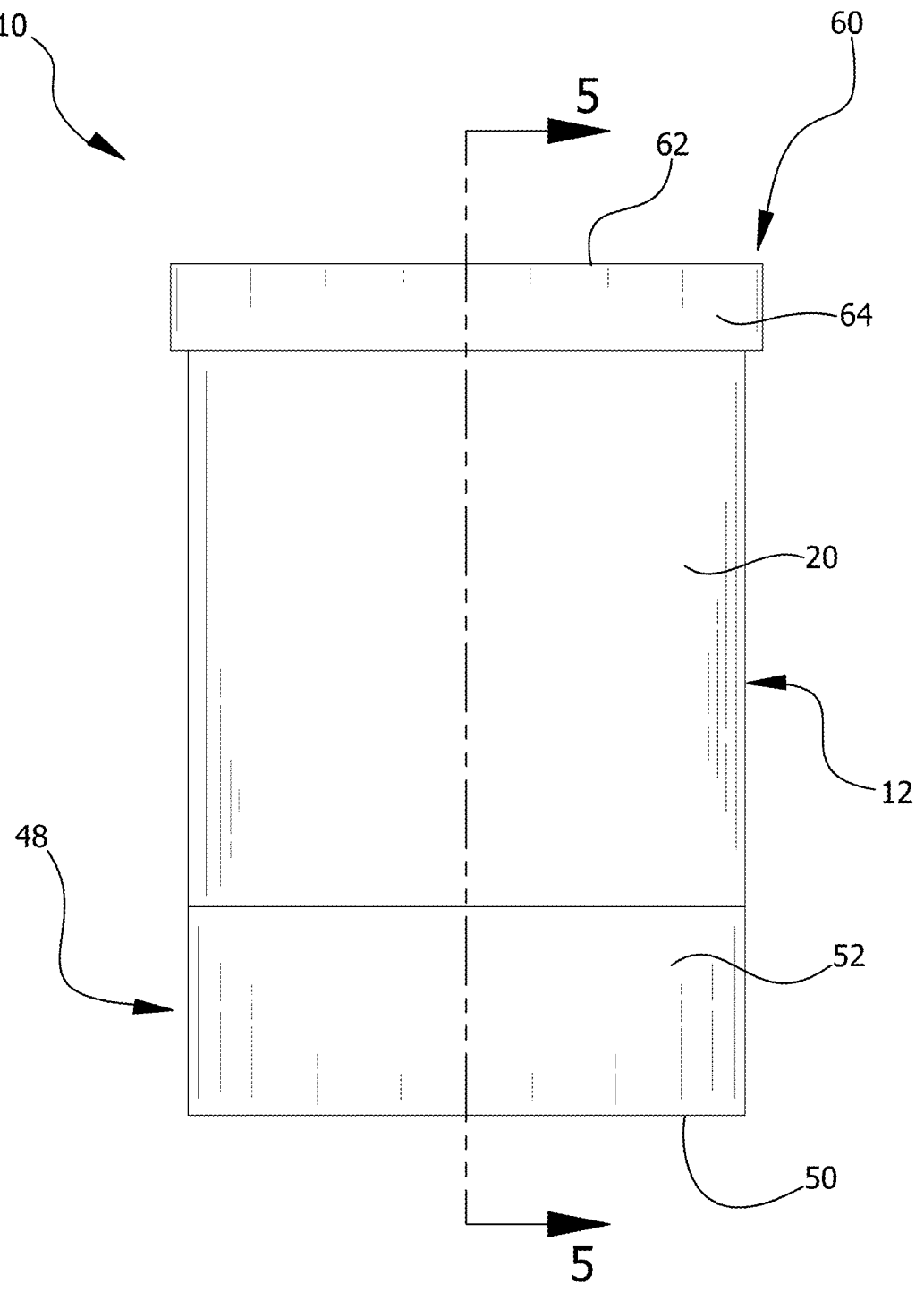
FIG. 4 is a front view of an embodiment of the disclosure.
Figure 5:
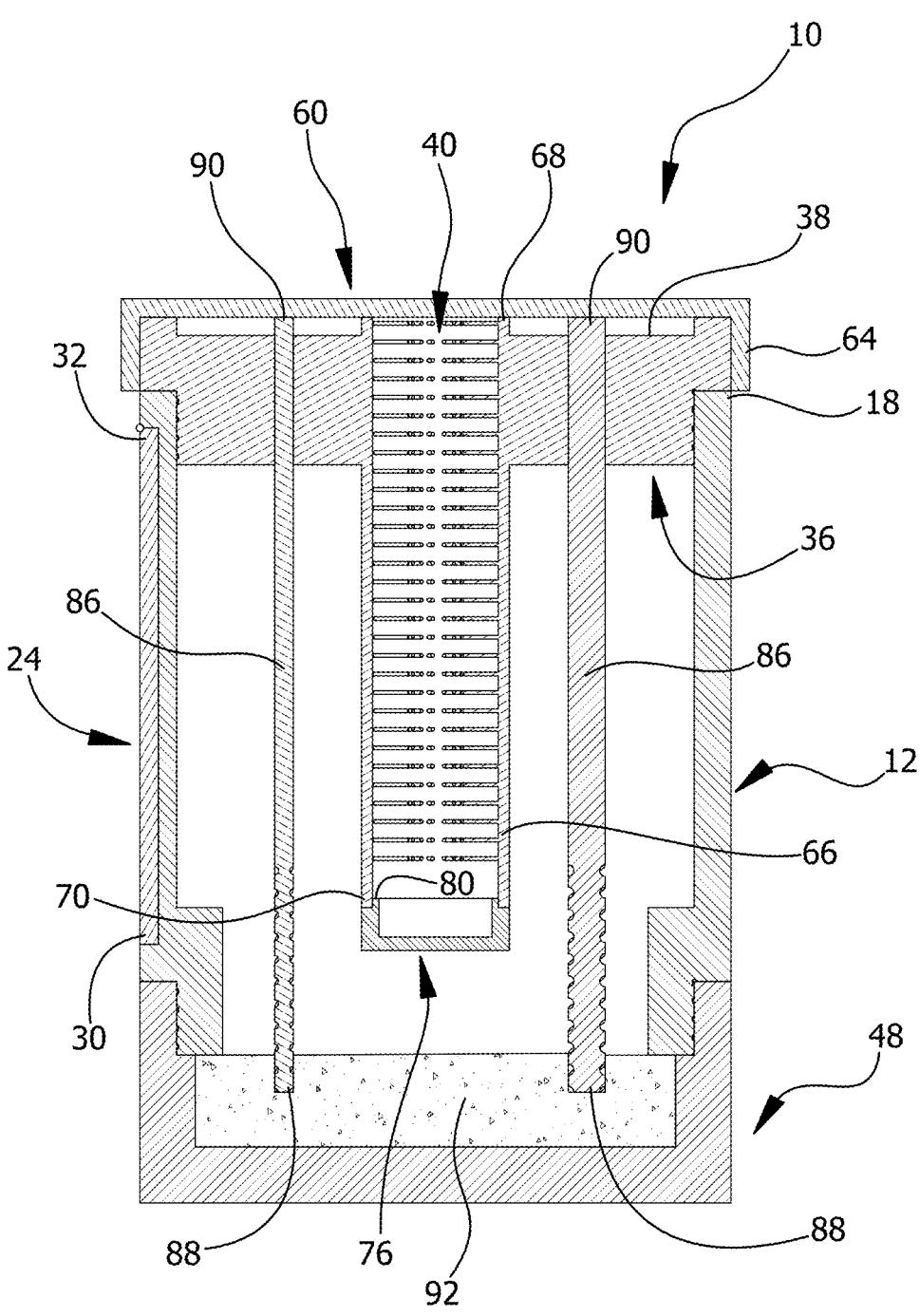
FIG. 5 is a cross-sectional view of an embodiment of the disclosure taken from Line 5-5 in FIG. 4.
Figure 6:
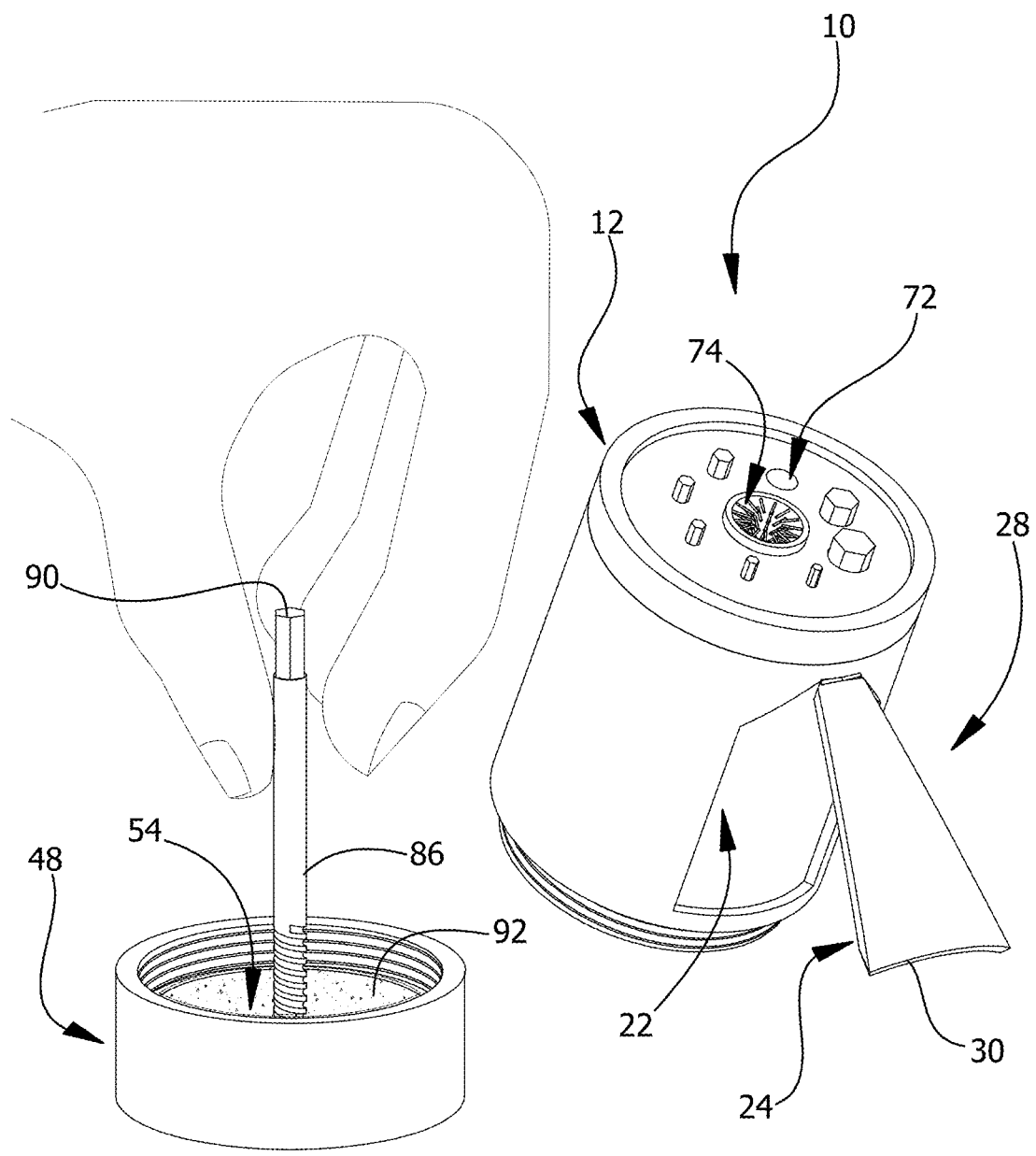
FIG. 6 is a perspective in-use view of an embodiment of the disclosure in which a drill bit is shown being dipped into a lubricant contained in a lubricant cup that has been separated from a cylindrical body.
Figure 7:
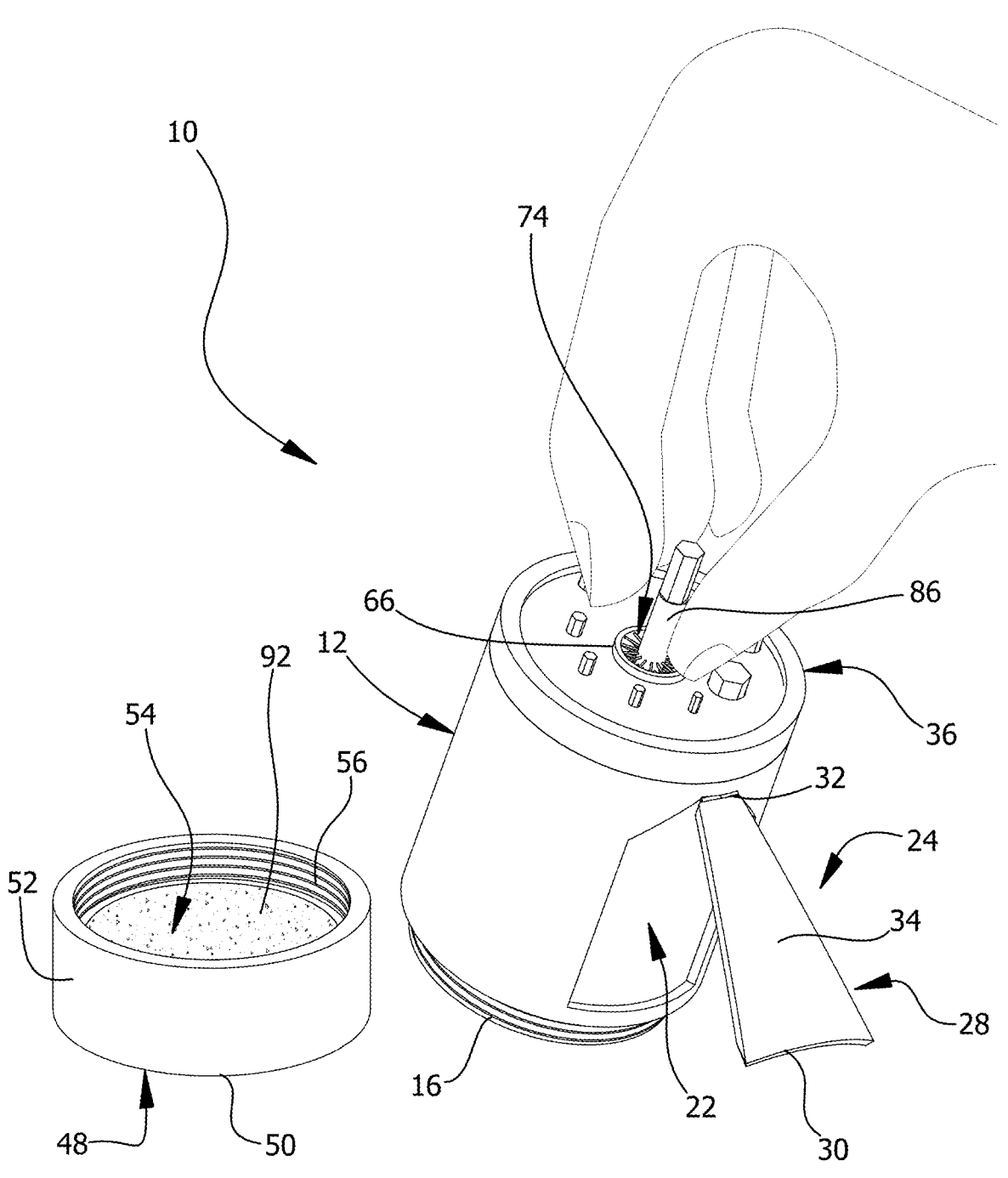
FIG. 7 is a perspective in-use view of an embodiment of the disclosure in which a drill bit is shown being brushed against bristles positioned in a cleaning tube.

With reference now to the drawings, and in particular to FIGS. 1 through 7 thereof, a new cutting tool storage case embodying the principles and concepts of an embodiment of the disclosure and generally designated by the reference numeral 10 will be described.

As best illustrated in FIGS. 1 through 7, the cutting tool storage case 10 generally comprises a body 12 which defines an interior space 14 therein. The interior space 14 is open at a bottom end 16 of the body 12 and at a top end 18 of the body 12. The body 12 also defines a recess 22 in an exterior surface 20 of the body 12. A kickstand 24 is pivotably mounted in the recess 22 of the body 12. The kickstand 24 is pivotable between a folded position 26 and an extended position 28. In the folded position 26, the kickstand 24 lies against the body 12 in the recess 22. In the extended position 28, the kickstand 24 extends outwardly from and downwardly with respect to the body 12. The kickstand 24 tapers from a distal end 30 to a proximal end 32 of the kickstand 24 with respect to the body 12. An outer surface 34 of the kickstand 24 aligns with the exterior surface 20 of the body 12 when the kickstand 24 is in the folded position 26. The body 12 has a cylindrical shape, but may have other shapes in other embodiments, such as a rectangular prism, a hexagonal prism, or the like. In some embodiments, a tether may couple to and extend between the distal end 30 of the kickstand 24 and the body 12. The tether may attach to the kickstand 24 and the body 12 via tying or a fastener such as a hook-and-loop fastener, a magnet, a latch, or the like. When the kickstand 24 is in the extended position 28 in such embodiments, the tether forms a closed loop with the kickstand 24 and the body 12, and the closed loop may interlock with a belt worn by a user such that the user may carry the cutting tool 86 storage case 10 on his or her person.

A holder member 36 is removably coupled to the top end 18 of the body 12. The holder member 36 defines a plurality of apertures 42 which extends through the holder member 36 to the interior space 14 of the body 12. Each aperture 42 of the plurality of apertures 42 is sized and configured to receive an associated cutting tool 86 of a plurality of cutting tools 86 therethrough to the interior space 14 of the body 12. The apertures 42 are radially arranged around a center 40 of a top surface 38 of the holder member 36 and are ordered in increasing size around the center 40. In some embodiments, the apertures 42 may be sized to have a pressed fit with their respective cutting tools 86, or a clamp or similar mechanism retains the cutting tools 86 to the holder member 36. The holder member 36 has external threads 44 which are engageable with internal threads 46 of the body 12 to removably couple the holder member 36 to the body 12. However, the holder member 36 may attach to the body 12 via a latch, a magnet, a snap fit connector, a clamp, or the like.

A lubricant cup 48 is coupled to the bottom end 16 of the body 12. The lubricant cup 48 comprises a bottom wall 50 and a perimeter wall 52 coupled to the bottom wall 50. The lubricant cup 48 defines a reservoir 54 which is surrounded by the bottom wall 50 and the perimeter wall 52. The reservoir 54 is configured for containing a lubricant 92 such as a wax or a grease for the cutting tools 86. The lubricant cup 48 has interior threads 56 on the perimeter wall 52 which are engageable with exterior threads 58 of the body 12 to removably couple the lubricant cup 48 to the body 12. However, the lubricant cup 48 may removably couple to the body 12 via a latch, a magnet, a snap fit connector, a clamp, or the like.

A lid 60 is removably mounted to the holder member 36 opposite the body 12. The lid 60 has a top wall 62 and a peripheral wall 64 coupled to the top wall 62. The peripheral wall 64 surrounds the holder member 36 and may attach to the holder member 36 via a pressed fit, interlocking screw threads, a latch, or the like.

A cleaning tube 66 is coupled to the holder member 36. The cleaning tube 66 extends through the center 40 of the holder member 36 and downwardly from the holder member 36. An upper end 68 of the cleaning tube 66 and a lower end 70 of the cleaning tube 66 are open. A plurality of bristles 74 is mounted to an interior surface 72 of the cleaning tube 66. The bristles 74 are distributed radially with respect to the cleaning tube 66 and longitudinally between the upper end 68 and the lower end 70 of the cleaning tube 66. A debris cup 76 is removably coupled to the lower end 70 of the cleaning tube 66. The debris cup 76 defines a cavity 78 therein which is open on an upper side 80 of the debris cup 76. The debris cup 76 engages the cleaning tube 66 with a press fit but may connect via a snap fit connector, screw threads, a magnet, or other suitable fastener.

In use, the cutting tools 86 may be stored such that each cutting tool 86 extends through a respective aperture 42 of the plurality of apertures 42 of the holder member 36, through the interior space 14 of the body 12, and abuts the lubricant 92 stored in the reservoir 54 of the lubricant cup 48. The cutting tools 86 may be, for example, drill bits or similar. A first end 88 of each cutting tool 86, which is positioned in abutment with the lubricant 92 during use of the cutting tool 86 storage case 10, may have a cutting edge such that, by storing the cutting tool 86 in the cutting tool 86 storage case 10, the cutting edge may be already lubricated prior to removing the cutting tool 86 and using the cutting tool 86 to cut a work piece. A second end 90 of each cutting tool 86 is positioned above the holder member 36 when the cutting tool 86 is stored in the respective aperture 42. The lid 60 prevents the cutting tools 86 from falling out of the respective apertures 42 when the body 12 is inverted. The top wall 62 of the lid 60 may abut the second end 90s of the cutting tools 86 to retain the cutting tools 86 against the lubricant 92.

The cutting tools 86 may be moved alternately in and out of the cleaning tube 66 and against the bristles 74 to brush scrap chips, dirt, and other debris from the cutting tools 86 to be collected in the debris cup 76. The debris cup 76 may then be removed from the cleaning tube 66 to empty the debris cup 76. Portions of the lubricant 92 may be added to each cutting tool 86 by inserting the cutting tool 86 into the associated aperture 42 through the body 12 and into the lubricant 92 or by removing the lubricant cup 48 from the body 12 and inserting the cutting tool 86 into the lubricant 92. With the lubricant cup 48 removed from the body 12, the body 12 may be set on a support surface and leaned against the kickstand 24 when the kickstand 24 is in the extended position 28. Positioning the body 12 in this manner raises the first end 88s of the cutting tools 86 away from the support surface so the cutting tools 86 don't mar the support surface.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cutting tool storage case comprising:
   a body defining an interior space therein, the interior space being open at a bottom end of the body;
   a holder member coupled to the top end of the body, the holder member defining a plurality of apertures which extends through the holder member to the interior space of the body, each aperture of the plurality of apertures being sized and configured to receive an associated cutting tool of a plurality of cutting tools therethrough to the interior space of the body; and
   a lubricant cup coupled to the bottom end of the body, the lubricant cup comprising a bottom wall and a perimeter wall coupled to the bottom wall, the lubricant cup defining a reservoir which is surrounded by the bottom wall and the perimeter wall, the reservoir being configured for containing a lubricant.

2. The cutting tool storage case of claim 1, wherein:

the interior space of the body is open at a top end of the body; and the holder member is removable from the body.

3. The cutting tool storage case of claim 2, wherein the holder member has external threads which are engageable with internal threads of the body to removably couple the holder member to the body.

4. The cutting tool storage case of claim 1, wherein, the plurality of apertures is radially arranged around a center of a top surface of the holder member.

5. The cutting tool storage case of claim 1, wherein the lubricant cup is removable from the body.

6. The cutting tool storage case of claim 5, wherein the lubricant cup has interior threads which are engageable with exterior threads of the body to removably couple the lubricant cup to the body.

7. The cutting tool storage case of claim 1, further comprising a lid removably mounted to the holder member opposite the body, the lid having a top wall and a peripheral wall coupled to the top wall, the peripheral wall surrounding the holder member.

8. The cutting tool storage case of claim 1, further comprising:

a cleaning tube coupled to the holder member, the cleaning tube extending through and downwardly from the holder member, an upper end of the cleaning tube being open; and a plurality of bristles mounted to an interior surface of the cleaning tube.

9. The cutting tool storage case of claim 8, wherein the plurality of bristles is distributed radially with respect to the cleaning tube and between the upper end and the lower end of the cleaning tube.

10. The cutting tool storage case of claim 8, wherein:

a lower end of the cleaning tube is open; and further comprising a debris cup removably coupled to the lower end of the cleaning tube, the debris cup defining a cavity therein which is open on an upper side of the debris cup.

11. The cutting tool storage case of claim 1, wherein:

the body defines a recess in an exterior surface of the body; and further comprising a kickstand mounted to the body, the kickstand being mounted in the recess of the body, the kickstand being pivotable with respect to the body between a folded position and an extended position, the kickstand lying against the body in the recess when the kickstand is positioned in the folded position, the kickstand extending outwardly from and downwardly with respect to the body when the kickstand is positioned in the extended position.

12. The cutting tool storage case of claim 11, wherein the kickstand tapers from a distal end to a proximal end of the kickstand with respect to the body.

13. The cutting tool storage case of claim 11, wherein:

the body has a cylindrical shape; and

an outer surface of the kickstand aligns with the exterior surface of the body when the kickstand is positioned in the folded position.

14. A cutting tool storage case comprising:

a body defining an interior space therein, the interior space being open at a bottom end of the body, the interior space being open at a top end of the body, the body defining a recess in an exterior surface of the body, the body having a cylindrical shape;

a holder member coupled to the top end of the body, the holder member defining a plurality of apertures which extends through the holder member to the interior space of the body, each aperture of the plurality of apertures being sized and configured to receive an associated cutting tool of a plurality of cutting tools therethrough to the interior space of the body, the plurality of apertures being radially arranged around a center of a top surface of the holder member, the holder member being removable from the body, the holder member having external threads which are engageable with internal threads of the body to removably couple the holder member to the body;

a lubricant cup coupled to the bottom end of the body, the lubricant cup comprising a bottom wall and a perimeter wall coupled to the bottom wall, the lubricant cup defining a reservoir which is surrounded by the bottom wall and the perimeter wall, the reservoir being configured for containing a lubricant, the lubricant cup being removable from the body, the lubricant cup having interior threads which are engageable with exterior threads of the body to removably couple the lubricant cup to the body;

a lid removably mounted to the holder member opposite the body, the lid having a top wall and a peripheral wall coupled to the top wall, the peripheral wall surrounding the holder member;

a cleaning tube coupled to the holder member, the cleaning tube extending through and downwardly from the holder member, an upper end of the cleaning tube being open, a lower end of the cleaning tube being open;

a plurality of bristles mounted to an interior surface of the cleaning tube, the plurality of bristles being distributed radially with respect to the cleaning tube and between the upper end and the lower end of the cleaning tube;

a debris cup removably coupled to the lower end of the cleaning tube, the debris cup defining a cavity therein which is open on an upper side of the debris cup; and a kickstand mounted to the body, the kickstand being mounted in the recess of the body, the kickstand being pivotable with respect to the body between a folded position and an extended position, the kickstand lying against the body in the recess when the kickstand is positioned in the folded position, the kickstand extending outwardly from and downwardly with respect to the body when the kickstand is positioned in the extended position, the kickstand tapering from a distal end to a proximal end of the kickstand with respect to the body, an outer surface of the kickstand aligning with the exterior surface of the body when the kickstand is positioned in the folded position.

* * * * *